United States Patent [19]

Miyanaga et al.

[11] Patent Number: 5,288,352
[45] Date of Patent: Feb. 22, 1994

[54] BEAD LOCKING APPARATUS FOR GREEN TIRE BUILDING MACHINE AND BEAD LOCKING METHOD FOR USE THEREWITH

[75] Inventors: Yoshinobu Miyanaga, Akashi; Masao Takami, Kobe; Hisashi Imai, Nishishirakawa; Koji Soeda, Kobe, all of Japan

[73] Assignee: Sumitomo Rubber Industries Limited, Hyogo, Japan

[21] Appl. No.: 983,047

[22] Filed: Nov. 30, 1992

Related U.S. Application Data

[62] Division of Ser. No. 733,133, Jul. 19, 1991, Pat. No. 5,223,074.

[30] Foreign Application Priority Data

Jul. 24, 1990 [JP] Japan .................. 2-195286

[51] Int. Cl.⁵ ............................ B29D 30/32
[52] U.S. Cl. .................... 156/135; 156/132; 156/417; 156/421.8
[58] Field of Search ............ 156/132, 131, 135, 130.7, 156/414, 415, 417, 421.8

[56] References Cited

U.S. PATENT DOCUMENTS 3,784,426  1/1974  Woodhall et al. .............. 156/132
3,816,218  6/1974  Felten ........................... 156/398
4,131,500  12/1978 Wilde et al. ................. 156/415 X
4,239,579  12/1980 Felen et al. .................. 156/417 X
4,243,451  1/1981  Kortman ....................... 156/132
4,472,233  9/1984  Fukamachi et al. .......... 156/415
4,683,021  7/1987  Stalter et al. ................ 156/132 X

FOREIGN PATENT DOCUMENTS

0020283  12/1980 European Pat. Off. .
0071840  2/1983  European Pat. Off. .

Primary Examiner—Michael W. Ball
Assistant Examiner—Francis J. Lorin
Attorney, Agent, or Firm—Birch, Stewart, Kolasch & Birch

[57] ABSTRACT

A bead locking apparatus includes bead support segments disposed in an annular arrangement at each of the axially opposite ends of a building drum mounted on a rotary shaft, the support segments being movable outward or inward radially of the drum, an elastic ring fitted in an annular recess formed in the outer periphery of the annular arrangement of segments, a segment drive device for moving the bead support segments radially outward, and a device for radially expanding the elastic ring independently of the segments. The bead is first primarily locked by the elastic ring and then secondarily locked by the support segments.

2 Claims, 8 Drawing Sheets

BEAD LOCKING APPARATUS FOR GREEN TIRE BUILDING MACHINE AND BEAD LOCKING METHOD FOR USE THEREWITH

This application is a divisional of copending application Ser. No. 07/733,133, U.S. Pat. No. 5,223,074 filed on Jul. 19, 1991, the entire contents of which are hereby incorporated by reference.

FIELD OF THE INVENTION

1. Background of the Invention

The present invention relates to a method of and apparatus for positioning beads around a tire component material wound around the building drum of a green tire building machine and locking the beads in position.

2. Description of Related Art

Figure 6:
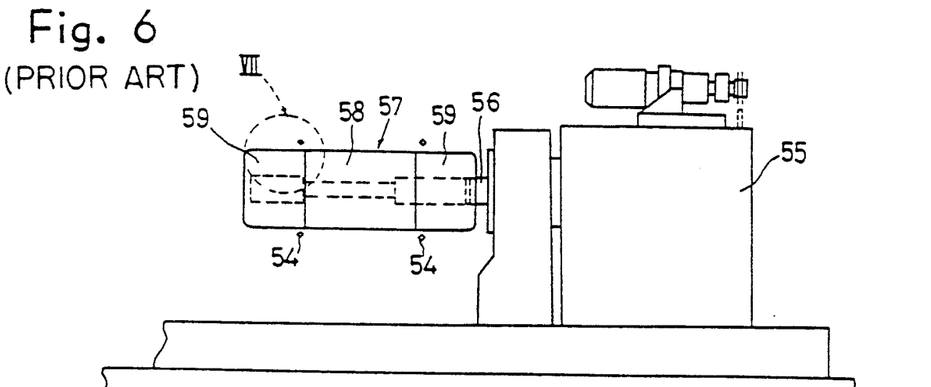
FIG. 6 is a view showing the appearance of a green tire component material conventional bead locking apparatus.

FIG. 6 shows a conventional machine for building green tires. The tire building machine comprises a headstock 55, a rotary shaft 56 supported at one end by the headstock 55 and a building drum 57 mounted on the rotary shaft 56. The periphery of the axial midportion of the drum 57 is provided with a building bladder 58 which is freely inflatable and contractable. The periphery of each of the opposite ends of the drum 57 has a side bladder 59 which is also freely inflatable and contractable.

Figure 7:
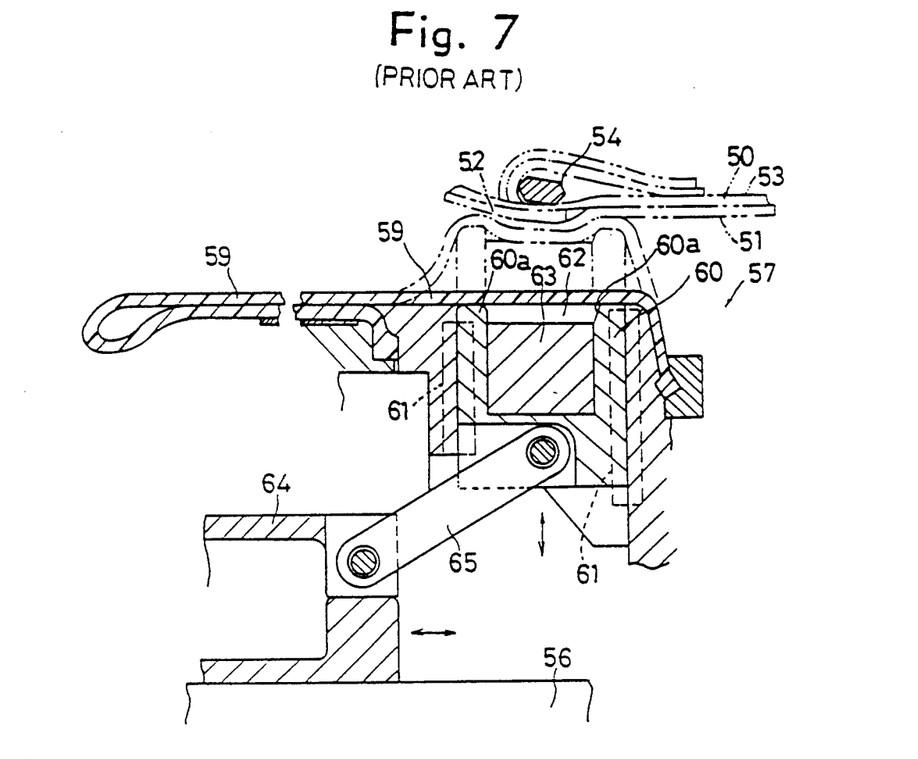
FIG. 7 is an enlarged sectional view of the portion VII shown in FIG. 6, i.e., a view in central longitudinal section showing a conventional bead locking apparatus.

FIG. 7 is an enlarged view in section of the portion VII shown in FIG. 6, i.e., a conventional bead locking apparatus. The bead locking apparatus is disposed inside the side bladder 59 and positioned at each of opposite end portions of the drum 57. The apparatus has bead support segments 60 in an annular arrangement. These segments 60 are movable radially of the drum by being guided by slide keys 61 which are arranged radially. An annular recess 62 is formed in the outer periphery of the annular arrangement of bead support segments 60. An annular elastic member 63 of rubber or the like is fitted in the recess 62. The outer periphery of the elastic member 63 is smaller in diameter than large-diameter portions 60a of the annular assembly of segments 60 which portions define the recess 62 therebetween. The rotary shaft 56 is provided with a drive member 64 which is movable axially of the shaft and is connected to each segment 60 by a link 65. The drive member 64, when moved axially, moves the segments 60 radially.

Green tires are built by the following process using the abovementioned building machine.

A plurality of tire component materials 50, for example, a rubber layer 51 as the innermost layer, a steel cord reinforcement layer 52 over the layer 51, and a carcass 53 over the layer 52 and the layer 51 are each wound around the building drum 57 with the bead support segments 60 and the side bladders 59 contracted and a portion of each side bladder 59 one over another. Each of beads 54 is then brought in over convolution of the tire component material 50 to position around the segments 60. Next, the drive member 64 moves axially thereby expanding the annular arrangement of segments 60 to radially push the material 50 outward with the large-diameter portions 60a of the segment assembly, with the bead 54 positioned between the large-diameter portions 60a, 60a and pressed by the elastic member 63. The bead 54 thus positioned between the portions 60a is thereby prevented from moving in the axial direction and locked. The slide bladder 59 is then inflated. The outer end portion of the material 50 is turned up around the bead 54 by forcing the inflated side bladder 59 inward axially of the building drum 57. Subsequently, the building bladder 58 on the drum 57 is inflated, whereby the material 50 positioned between the pair of beads 54 is shaped to a toroidal form.

The steps formed by the large-diameter portions 60a of the bead support segments 60 and the elastic member 63 of smaller diameter prevent the bead 54 from deflecting in the axial direction.

Figure 5:
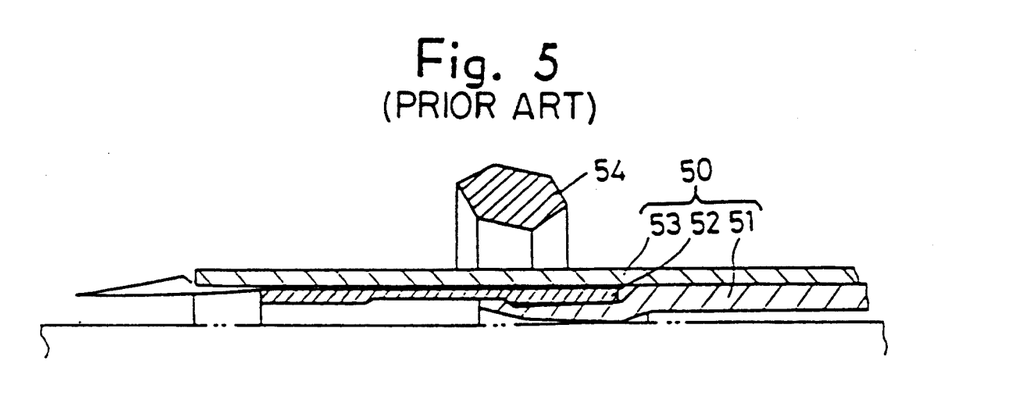
FIG. 5 is a view in section showing an end portion of a tire component material.
Figure 8:
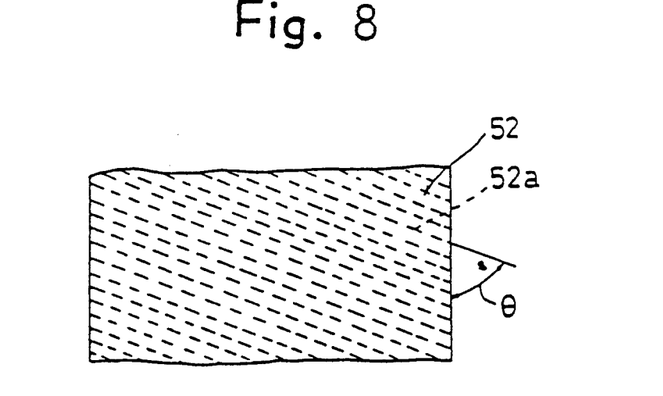
FIG. 8 is a diagram illustrating the bias angle of the steel cords in a steel cord reinforcement layer.

The steel cord reinforcement layer 52 of the tire component material 50 has a small width only sufficient to surround the bead 54 and is positioned only at each end of the carcass ply 53 as seen in FIG. 5. The steel cords 52a are in a bias arrangement as shown in FIG. 8.

Figure 10:
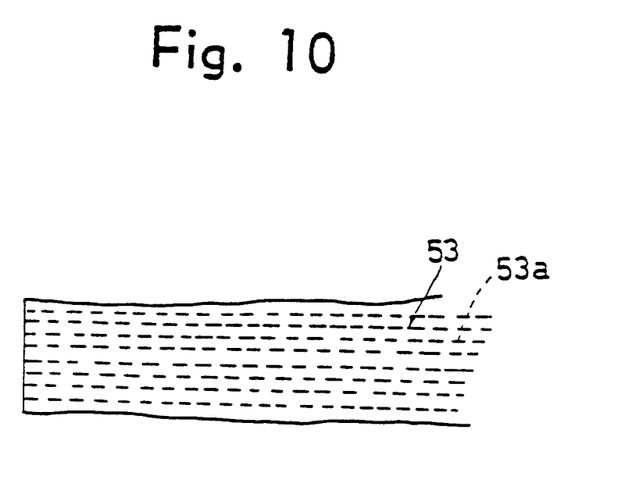
FIG. 10 is a diagram illustrating the arrangement of steel cords in a carcass ply.

Further as shown in FIG. 10, the carcass ply 53 of the tire component material 50 includes steel cords 53a which are arranged in parallel to the radial direction.

The bead locking method employed in the conventional building process described has the following drawbacks.

Figure 9:
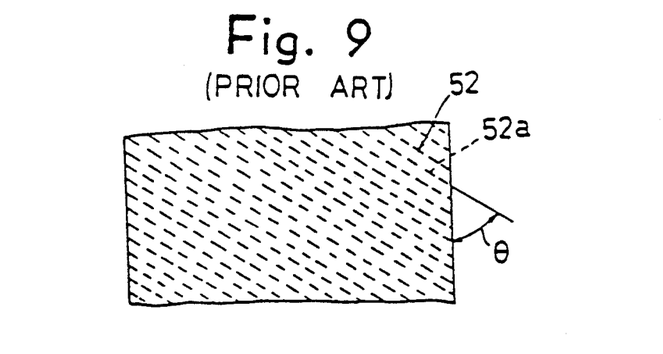
FIG. 9 is a diagram illustrating steel cord angles as changed to smaller angles by uneven deformation of the steel cord layer.
Figure 11:
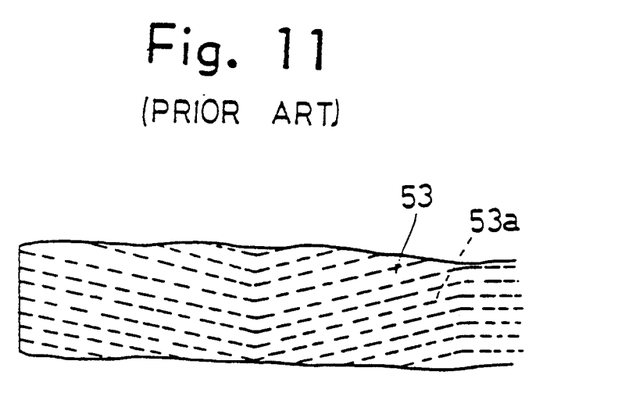
FIG. 11 is a diagram illustrating deformation of steel cords due to uneven deformation of the carcass ply.

When the annular arrangement of bead segments 60 is radially expanded, the large-diameter portions 60a of the segments 60 first cause the side bladder 59 to press the tire component material 50. Accordingly, the material 50 radially expands to increase its circumferential length. This results in a delay in causing the elastic member 63 to contact the material 50 through the side bladder 59. The steel cord reinforcement layer 52 is therefore so deformed that the bias angle $\theta$ of the steel cords 52a becomes small as shown in FIG. 9. Further the steel cords 53a of the carcass ply 53 are bent by contact with the reinforcement layer 52 as shown in FIG. 11. Since such deformation is uneven, there arises the problem that the cord path (distance between the beads at opposite ends) becomes uneven over the entire circumference to impair tire uniformity. Further if a tire is made with steel cords 53a of the carcass ply 53 in a bent state; another problem is encountered, that is, when the tire is inflated with air, the steel cords 53a stretch and rotate as bent to impair the durability of the tire.

Further when the arrangement of segments 60 is expanded, a clearance occurs circumferentially of the arrangement between the adjacent segments, with the result that with respect to the circumferential direction, the material 50 is locally pressed by the large-diameter portions 60a of the segment arrangement and left unpressed also locally. Thus, the material 50 is deformed unevenly with respect to the circumferential direction of the tire.

Stated more specifically, the material 50 is pressed radially from inside by the pair of large-diameter portions 60a on opposite sides of the bead 54 and is also pressed radially from outside by the bead 54. Accordingly, the material 50 is supported at three points, and this mode of support is low in stability. When the segment arrangement is further expanded, the material 50 is held between the bead 54 and the elastic member 63. When thus held, the material 50 is supported with good stability with respect to the axial direction.

Until the elastic member 63 starts to press the tire forming material 50 after the large-diameter portions 60a start to press the tire component material 50, the material 50 is supported by these portions 60a and the bead 54 with very low stability. Accordingly, it is likely that slippage will occur between the material 50 and the large-diameter portions 60a or between the bead 54 and the material 50, although such slippage does not always occur. As a result, the material 50 as positioned between the bead 54 and the large-diameter portions 60a is stretched by being pulled or will remain unstretched to undergo uneven deformation. It is also likely that the bead 54 will move in the axial direction.

If the material 50 deforms unevenly with respect to the axial or circumferential direction, or if the bead 54 becomes shifted, the cord path (the bead-to-bead distance) will vary circumferentially of the tire. This causes the problem that variations in cord path adversely affect tire uniformity.

OBJECT AND SUMMARY OF THE INVENTION

An object of the present invention is to provide a method and an apparatus for use in tire building machines for locking beads in position without causing uneven deformation of the tire component material and without adversely affecting tire uniformity and durability.

The present invention provides a bead locking apparatus which comprises bead support segments disposed in an annular arrangement at each of axially opposite ends of a building drum mounted on a rotary shaft, the support segments being movable outward or inward radially of the drum, an elastic ring fitted in an annular recess formed in the outer periphery of the annular arrangement of segments, segment drive means for moving the bead support segments radially outward, and means for radially expanding the elastic ring independently of the segments.

The segment drive means comprises a first piston mounted on the rotary shaft of the building drum and movable axially thereof, and a first cam attached to the forward end of the first piston for moving the segments radially by sliding contact with the inner periphery of the annular arrangement of segments.

Each of the segments has a guide bore extending therethrough radially of the drum and permitting the recess to communicate with the inner peripheral side of the annular arrangement therethrough. A rod is slidably inserted through the guide bore and has an outer end connected to the inner periphery of the elastic ring and an inner end connected to the ring expanding means. The ring expanding means comprises a second piston mounted on the rotary shaft of the forming drum and movable axially thereof, and a second cam provided at the forward end of the second piston for moving the rod axially thereof by sliding contact with the inner end of the rod.

A cylinder having an annular cavity is fixedly fitted around the rotary shaft concentrically therewith. The cavity of the cylinder is divided by a partition wall into two chambers arranged axially of the shaft. The first piston is accommodated in one of the chambers and movable axially thereof, and the second piston is accommodated in the other chamber movable axially thereof. The first cam on the first piston is formed with guide channels arranged at a predetermined spacing circumferentially of the piston, and the second cam on the second piston is movable axially of the piston through the guide channels.

The segment drive means may alternatively comprise a first piston mounted on the rotary shaft of the building drum and movable axially thereof, and a first link connecting the first piston to the inner peripheral portion of each of the segments.

The ring expanding means may alternatively comprise a second piston mounted on the rotary shaft of the building drum and movable axially thereof, and a second link connecting the second piston to the inner end of the rod.

Beads are locked in position by the following method using the above locking apparatus.

First, a tire component material is wound around the building drum. The bead is positioned at each of opposite side portions of the wound material at the position where the bead support segments are arranged. The elastic ring fitted in the recess in the annular arrangement of bead support segments is then radially expanded. The elastic ring first presses the side bladder into contact with the tire component material. The elastic ring and the annular arrangement of bead support segments are further expanded to bring the tire component material into contact with the bead, causing the elastic ring to initially lock the bead. The bead support segments are thereafter moved further radially outward to cause large-diameter portions of the annular segment arrangement to press the material, whereby the bead is locked by the segments secondarily.

According to the present invention, the elastic ring first presses the tire component material against the bead, so that the cord path (cord length from bead to bead) of the tire component material is locked, and maintained at a uniform length over the entire circumference of the tire. The material is therefore held between the elastic ring and the bead and thereby supported with good stability.

Accordingly, the bead is prevented from shifting or the material is precluded from bending when the bead support segments are thereafter moved radially outward to cause the large-diameter portions thereof to press the material.

Thus according to the present invention, the bead is primarily locked in position by the elastic ring. The cord path can therefore be maintained in a uniform length over the entire circumference. With the tire component material held locked by the bead and the elastic ring, the tire component material is then radially expanded by the bead support segments. This prevents the steel cords of the material from uneven deformation.

DETAILED DESCRIPTION OF THE PREFERRED EMBODIMENTS

Embodiments of the present invention will be described below with reference to the drawings.

Figure 1:
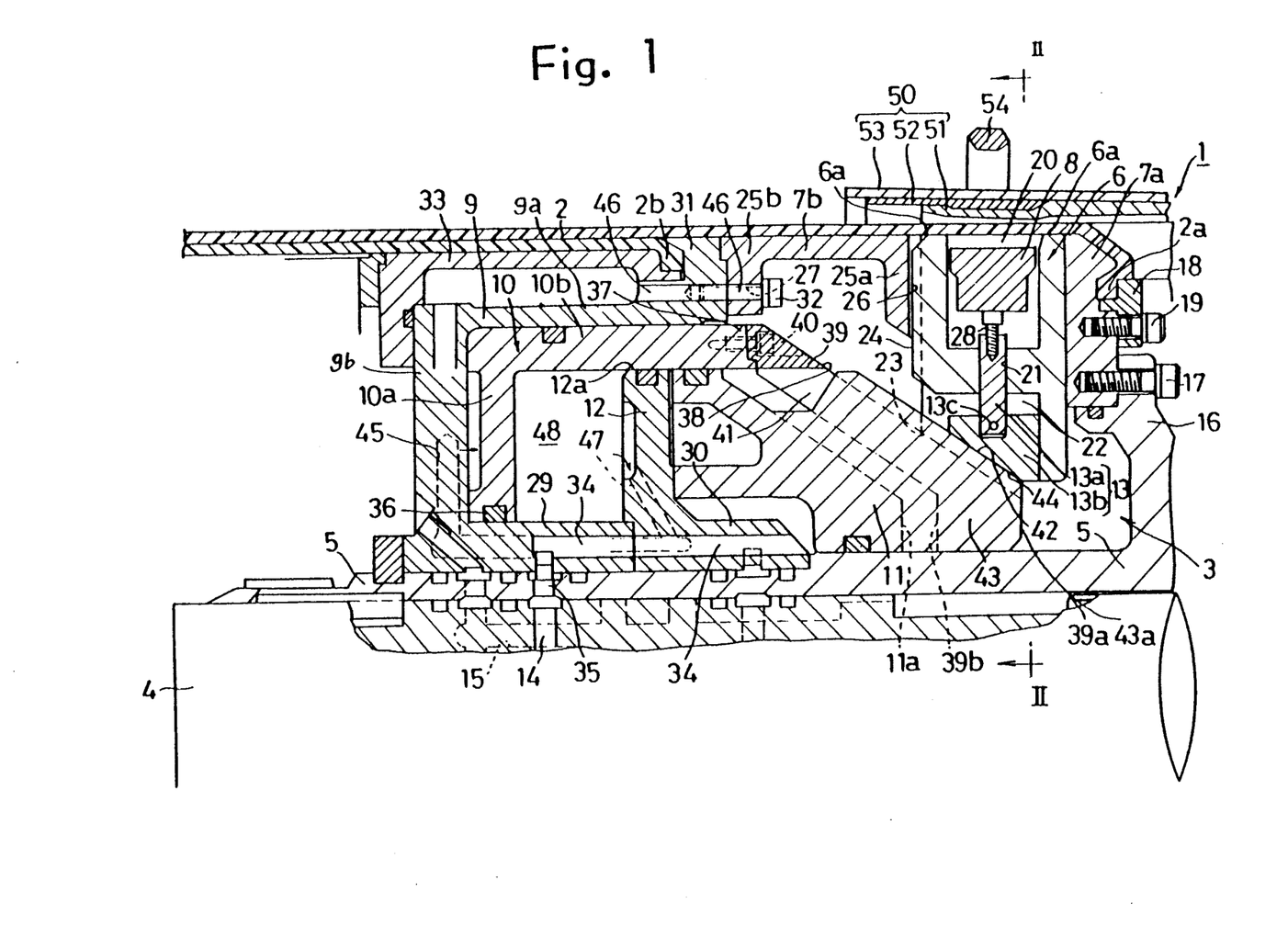
FIG. 1 is a view in central longitudinal section showing a bead locking apparatus embodying the present invention.

FIG. 1 shows a bead locking apparatus 3 of the present invention. The apparatus 3 is provided inside a side bladder 2 at each of opposite ends of a building drum 1 of a green tire buidling machine. The drawing shows the apparatus disposed at the left end of the drum 1. The apparatus at the right end of the drum has the same construction as the illustrated apparatus and is therefore not shown. The tire building machine has the same appearance as the one shown in FIG. 6 and is therefore not shown.

The bead locking apparatus 3 is mounted on a tubular holder 5 fixedly fitted around a rotary shaft 4 which is disposed at the center of the building drum 1. The apparatus 3 generally comprises bead support segments 6 movable outward and inward radially of the drum, a pair of first and second holding rings 7a, 7b arranged at axially opposite sides of the segments 6 for slidably holding the segments therebetween, an elastic ring 8 fitted around the arrangement of segments 6, a cylinder 9 fixed to the holder 5 for driving the segments 6 radially outward, a first piston 10 slidably fitted in the cylinder 9 for moving the segments radially outward, a second piston 11 slidably fitted in the first piston for radially expanding the elastic ring 8, a partition wall 12 provided between the first and second pistons 10, 11, ring expanding members 13 provided between the elastic ring 8 and the second piston 11, and so on.

The rotary shaft 4 has supply-discharge channels 14, 15 for supplying compressed air for operating the pistons.

The tubular holder 5 is integrally formed with a mount flange 16 positioned at a side end of the building drum 1 and projecting radially outwardly of the shaft 4. The first holding ring 7a is fastened to the flange 16 by bolts 17 and has an outer peripheral portion, to which one end 2a of the side bladder 2 is fastened by a fixing ring 18 and bolts 19. The side bladder 2 covers the entire arrangement of segments 6.

The bead support segments 6 are in the form of pieces obtained by dividing a ring in the circumferential direction. The segments 6 are in an annular arrangement and are slidably in contact with the inner face of the first holding ring 7a. A recess 20 in the form of a groove of U-shaped cross section is formed in the outer periphery of the annular arrangement of segments 6 and extends circumferentially in an annular form. A guide bore 21 extends through the bottom of recessed portion 20 of each segment 6 centrally thereof and permits the recessed portion 20 to communicate with the inner peripheral side of the segment. A guide cavity 22 is formed in this side of the segment 6. The inner peripheral surface of the segment 6 provided by the circumferentially opposed portions defining the guide cavity 22 forms a cam face 23 which is inclined with respect to the axis of the shaft 4. The end face of the segment 6 opposite to the other end face thereof slidably in contact with the first holding ring 7a has a guide key 24 extending radially of the annular arrangement.

The second holding ring 7b is provided at the respective axially opposite ends thereof with a first flange 25a and a second flange 25b projecting radially inward. The first flange 25a is slidably in contact with the end face of the segment 6 having the guide key 24. Key grooves 26 for the guide keys 24 to fit in are formed in a radial arrangement in the surface of the flange 25a opposed to the segments 6. The second flange 25b is formed with bores 27 for attaching the ring 7b to the cylinder 9.

The bead support segments 6 are held between the first and second holding rings 7a and 7b radially movably. These rings 7a, 7b have an outside diameter which is equal to the smallest outside diameter of the annular arrangement of segments 6 when the segments are retracted radially inward.

The elastic ring 8, which is made of rubber or the like is fitted in the recess 20 of annular arrangement of the segments 6 and radially expandable and shrinkable. The segments 6 are forced radially inward by the tension of the elastic ring 8, thus resulting in a reduced bead support segment diameter. The ring 8 is connected at its inner periphery to connecting rods 13a by screws 28. Each of the connecting rods 13a is axially movably inserted through the guide bore 21 of each segment 6.

The cylinder 9 has an inner cylinder wall 29 fitted around the tubular holder 5, an outer cylinder wall 9a concentric with the inner cylinder wall 29 and a bottom wall 9b integrally interconnecting the inner and outer walls 29, 9a at the axially outer end of the cylinder. The partition wall 12 is secured to the axially inner end of the inner cylinder wall 29. An annular space is defined by the outer periphery of the partition wall 12 and the inner periphery of the outer cylinder wall 9a. A boss 30 fitting around the holder 5 axially extends inward from the inner peripheral portion of the partition wall 12.

The outer cylinder wall 9a of the cylinder 9 is provided, at its axially inner end, with a flange 31 in bearing contact with the second flange 25b of the second holding ring 7b. The flange 31 and the second flange 25b are fastened to each other by bolts 32 inserted through the respective bores 27 formed in the flange 25b.

A tubular holder 33 for the side bladder 2 is fixedly fitted around the cylinder 9. The outer end 2b of the side bladder 2 is fixedly held by the holder 33 and the cylinder flange 31.

A supply-discharge channel 34 for ring expanding compressed air extends through the inner cylinder wall 29 and through the boss 30 of the partition wall 12. The channel 34 communicates with the supply-discharge channel 14 in the rotary shaft 4 via a port 35.

The first piston 10 for driving (moving radially outward) the segments 6 has a plate ring portion 10a centrally formed with a slidable inner periphery 36 fitted around the inner cylinder wall 29, and a tubular portion 10b integral with the ring portion 10a and slidable on the inner periphery of the outer cylinder wall 9a. The tubular portion 10b of the first piston 10 extends axially inward through the annular space inside the outer cylinder wall 9a around the partition wall 12 to provide a projecting end 37. First cams 39 for driving the segments 6 are fixed to this end 37 with bolts 40 and each have a slanting face 38 slidably in contact with the cam face 23 of the segment 6. The inner face of the forward end 39a of each first cam 39 is slidably in contact with the outer periphery of the holder 5. The cam forward end 39a has a side face 39b opposed to the second piston 11, which is adapted to come into contact with this face 39b.

Figure 2:
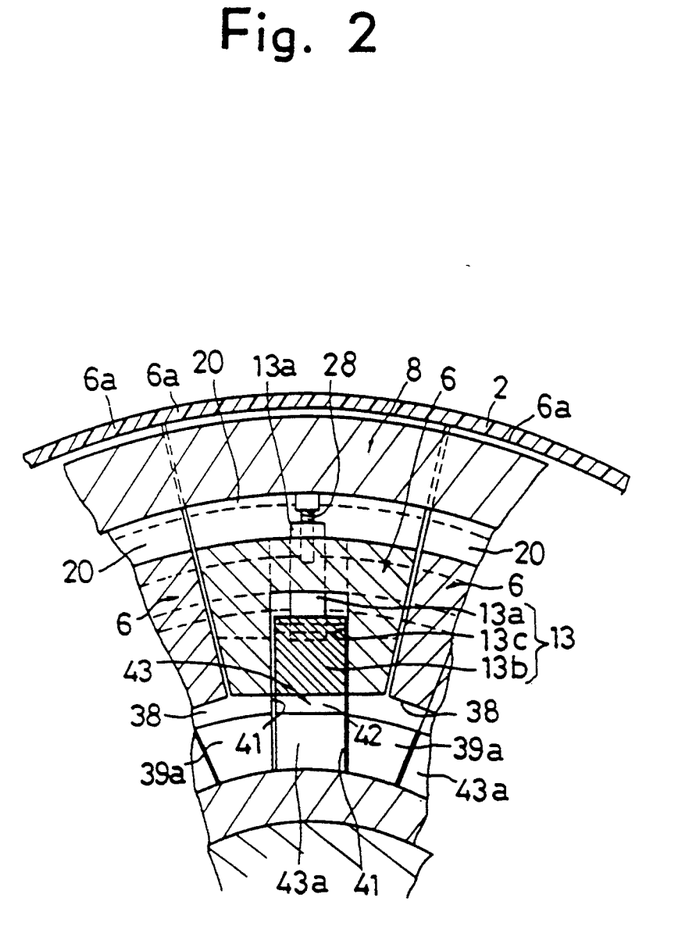
FIG. 2 is a view in section taken along the line II—II in FIG. 1.

The first cams 39 are equal in number to the number of segments 6 and are arranged circumferentially around the holder 5 at a predetermined spacing so as to oppose the respective circumferential divided portions of the segments 6 as seen in FIG. 2. Thus, second cam guide channels 41 are formed between the circumferentially adjacent first cams 39.

The second piston 11 for radially expanding the elastic ring 8 is generally conical and has an outer periphery slidably in contact with the inner periphery of the tubular portion 10a of the first piston 10 and an inner periphery slidably in contact with the outer periphery of the tubular holder 5. The second piston 11 is axially movable between the partition wall 12 and the first cams 39. Although the first and second pistons 10, 11 are axially movable independently of each other, the contact of the forward end face 11a of the second piston 11 with the side faces 39b of the first cams 39 renders the first piston 10 movable with the second piston 11.

Projecting from the axially inner end of the second piston 11 and integral therewith are second cams 43 for radially expanding the elastic ring 8. The second cams 43 have a slanting face 42 having the same angle of inclination as the slanting face 38 of the first cam 39. The second cams 43 extend axially inward through the respective guide channels 41 formed between the first cams 39.

Each of the ring expanding members 13 comprises the connecting rod 13a extending through the guide bore 21 in the segment 6, and a movable block 13b radially movably fitted in the guide cavity 22 of the segment 6 and connected to the rod 13a by a pin 13c. The inner face of the movable block 13b serves as a cam face 44 in slidable contact with the slanting face 42 of the second cam 43.

Indicated at 45 is a supply-discharge channel formed in the cylinder 9 for compressed air for operating the first piston 10, at 46 a supply-discharge channel for compressed air for inflating the side bladder 2, and at 47 an air channel for holding a space 48 defined by the first piston 10 and the partition wall 12 in communication with the atmosphere.

Next, the operation of the above embodiment, i.e., the bead locking apparatus 3, will be described.

First, the innermost rubber layer 51 of the tire component material 50 is wound around the building drum 1 with a reduced diameter, with the bead support segments 6 in the radially retracted position and with the side bladders 2 in a contracted state so that each end of the layer 51 is applied and wound over the segments 6 and the side bladder 2. Next, the steel cord reinforcement layer 52 is wound around each end of the rubber layer 51, and the carcass ply 53 is wound around the layers 51, 52. Subsequently, a pair of beads 54 are fitted around the respective ends of the material from axially opposite sides of the building drum 1 and held in position around the bead support segments 6 (see FIG. 1).

Compressed air is then supplied to the chamber surrounded by the second piston 11 and the partition wall 12 through the supply-discharge channels 14, 34 to thereby move the second piston 11 toward the axial midportion of the drum 1. This movement of the second piston 11 axially moves the second cams 43, which in turn force the movable blocks 13b radially outward. The movement of the blocks 13b moves the connecting rods 13a, radially expanding the elastic ring 8 to position the outer periphery of the ring 8 as projected outward beyond the outer periphery 6a of annular arrangement of the segments 6. The ring 8 causes the side bladder 2 to contact with and press the material 50 radially outward (see FIG. 3). At this time, the forward end 11a of the second piston 11 comes into contact with the side faces 39b of the first cams 39.

Figure 3:
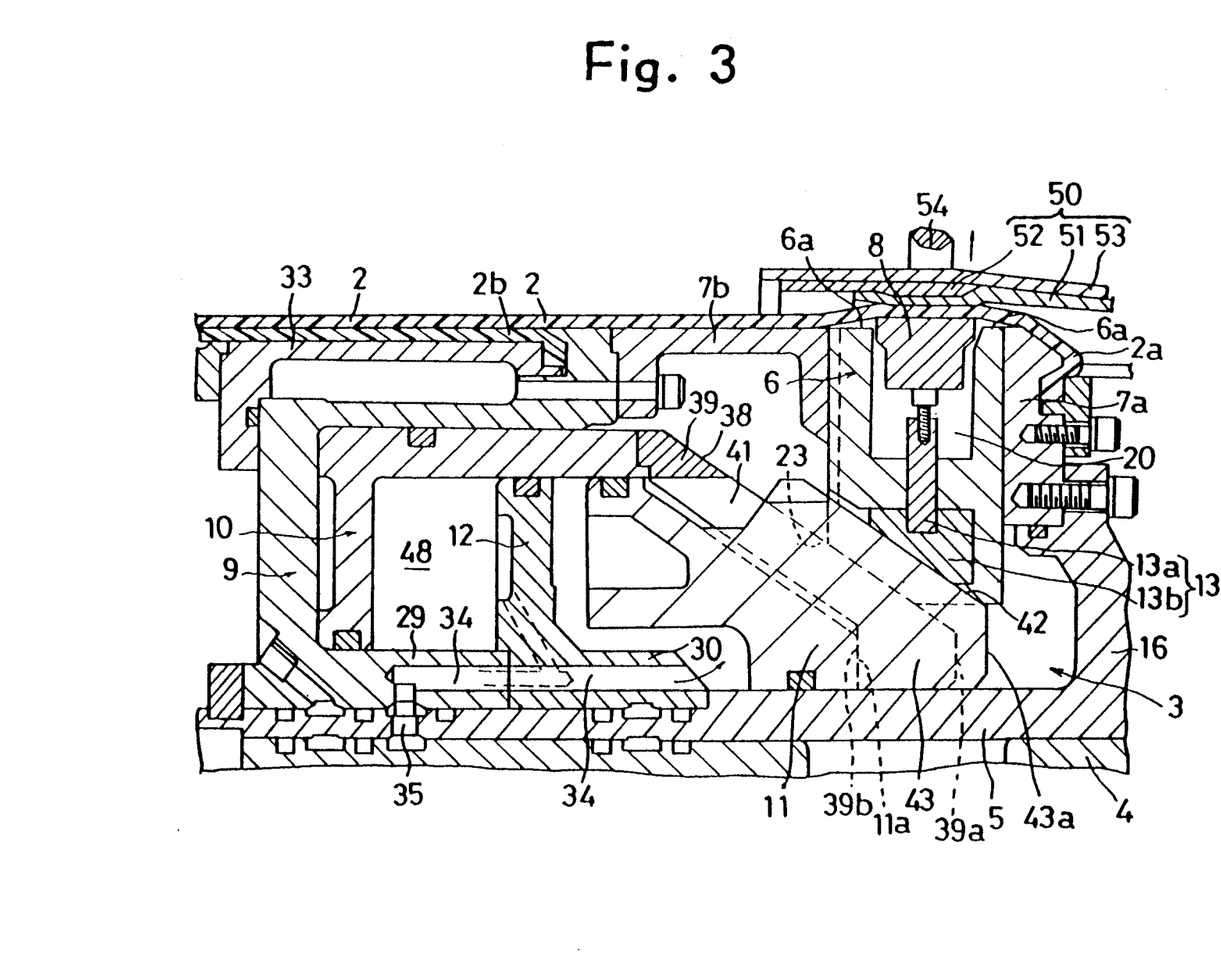
FIG. 3 is a view in central longitudinal section showing the same immediately after the start of a primary locking operation.

The second piston 11 is further moved axially, moving the first piston 10 and the first cams 39 therewith, that is, the expansion of the ring 8 takes place where the outer peripheries 9a, 6a of the segment 6 are in contact with the side bladder 2 but not in contact with the tire component material 50 through the side bladder 2. In this case, compressed air may be supplied to the cylinder chamber 48 via the supply-discharge channel 45. However, the first piston 10 should not be moved more rapidly than the second piston 11.

The movement of the first cams 39 moves the annular arrangement of segments radially outward to increase its diameter. However, since the first cams 39 and the second cams 43 move at the same speed, the segments 6 and the elastic ring 8 remain in the same state as shown in FIG. 3 for expansion, finally bringing the outer periphery of the tire component material 50 into contact with the inner periphery of the bead 54. The forward end faces 43a of the second cams 43 come into contact with the mount flange 16 to stop the second piston 11. In this state, the tire component material 50 is firmly held between the elastic ring 8 and the bead 54. Thus, the ring 8 primarily locks or holds the bead 54 firmly in position.

Subsequently, compressed air is supplied to the cylinder chamber 48 via the channel 45 to move the first piston 10 axially, thereby causing the first cams 39 to move the segments 6 radially outward further, i.e., to radially expand the annular arrangement thereof. The outer peripheries 6a, 6a of the segment arrangement come into contact with the tire component material 50 and then project to a predermined diameter radially outward beyond the outer periphery of the elastic ring 8 to forcibly stretch the material 50 radially outward. The forward ends 39a of the first cams 39 then come into contact with the mount flange 16, whereby the first piston 10 is stopped (see FIG. 4).

Figure 4:
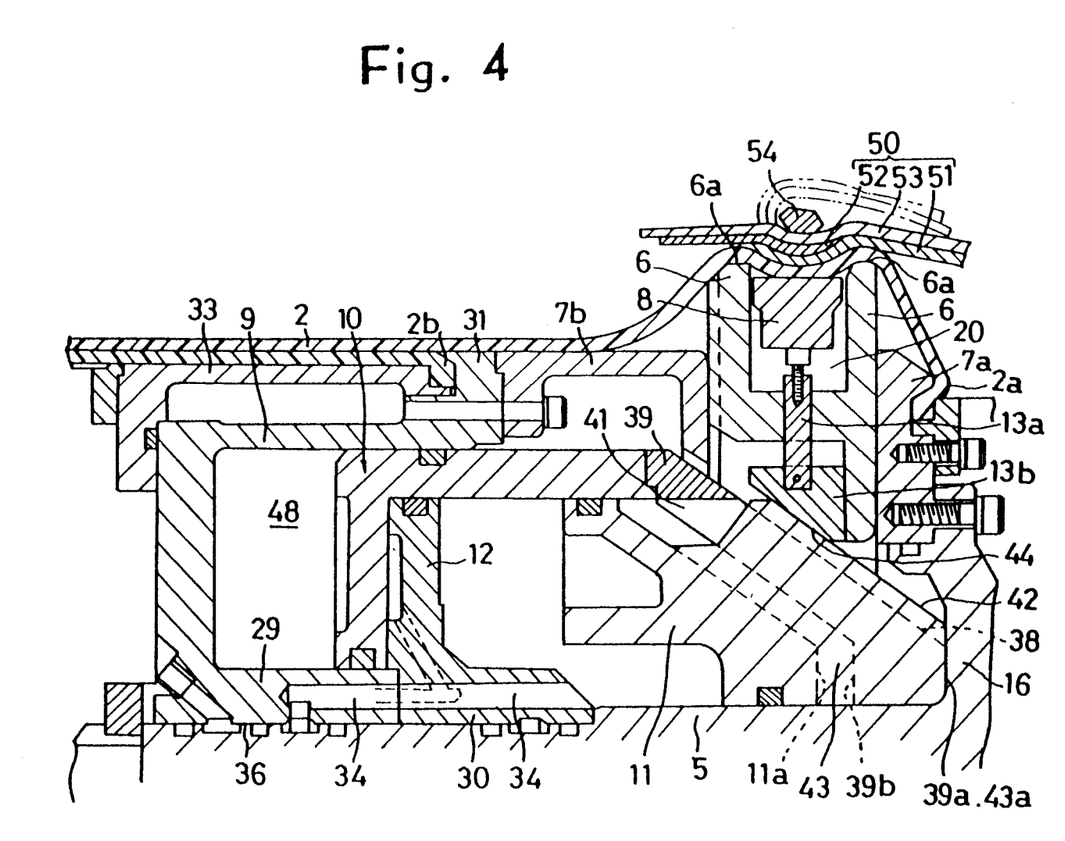
FIG. 4 is a view in central longitudinal section showing the same upon completion of a secondary locking operation.

When ready to be compressed by the segment outer periphery 6a, the material 50 is fixedly held between the ring 8 and the bead 54, and therefore will not be moved axially and can be deformed uniformly with respect to the circumferential direction. The beads 54 are, thus, secondarily or finally locked or held firmly in position by the segments 6, 6 and completely prevented from moving axially.

After the bead 54 has been thus locked in two steps, compressed air is supplied to each side bladder 2 to inflate the bladder 2, whereby each end portion of the tire component material 50 is turned around the bead 54 to the state indicated in broken lines in FIG. 4. The portion of the tire component material 50 lying between the pair of beads 54 is then formed to a toroidal shape by the building drum 1.

When the side bladder 2 is contracted upon completion of the building operation, the supply of compressed air to the bead locking apparatus 3 is discontinued, and the air is discharged and drawn off from the apparatus 3. The elastic ring 8 spontaneously contracts owing to its elasticity, and at the same time, forces the segments 6 radially inward, causing the cam faces 23 of the segments 6 and the cam faces 44 of the movable blocks 13b to push the slanting faces 38, 42 of the first and second cams 39, 43, respectively, and retract the first and second pistons 10, 11 to the position shown in FIG. 1.

According to the embodiment described, until the bead 54 is locked to the tire component material 50 by the bead support segment 6, 6 to fix the cord path. the expansion is effected by the elastic ring 8, so that the outer peripheries 6a of the bead support segments 6 exert no uneven expanding force on the tire component material 50. For this reason, the steel cords 52a, 53a of the steel cord reinforcement layer 52 and the carcass ply 53 (see FIGS. 8 and 10) will not be unevenly deformed or bent even if a clearance occurs between the segments 6.

With the embodiment described above, the bead 54 is primarily locked by the elastic ring 8 fitted in the recess 20 of the segment arrangement before being locked by the bead support segments 6. Accordingly, the apparatus does not unevenly deform the tire component material 50, exerts no adverse influence on tire uniformity, in no way impairs the durability of the tire to be produced and therefore affords tires of improved quality.

For use in a green tire building machine comprising an expandable building drum 1, and a side bladder 2 disposed at each of opposite sides of the drum 1, the bead locking apparatus of the present invention is characterized by an arrangement of bead support segments 6 expandably provided inside each of the side bladder 2 and positioned at each side end portion of the building drum 1, and an elastic ring 8 radially expandably fitted in recesses 20 in the outer peripheries of the bead support segments 6 and made of elastic material, the segments 6 and the ring 8 being individually movable for expansion. Accordingly, it is possible to primarily lock each bead 54 by the elastic ring 8 to fix the cord path of the tire component material 50 uniformly over the entire circumference, and to thereafter effect secondary locking by the bead support segments 6, without unevenly deforming the tire component material 50 owing to a clearance between the segments 6 which is produced by the expansion of the segments 6, whereas the material 50 can be prevented from axial displacement by the segments as in the prior art. These features assures tires of improved durability and higher quality.

Figure 12:
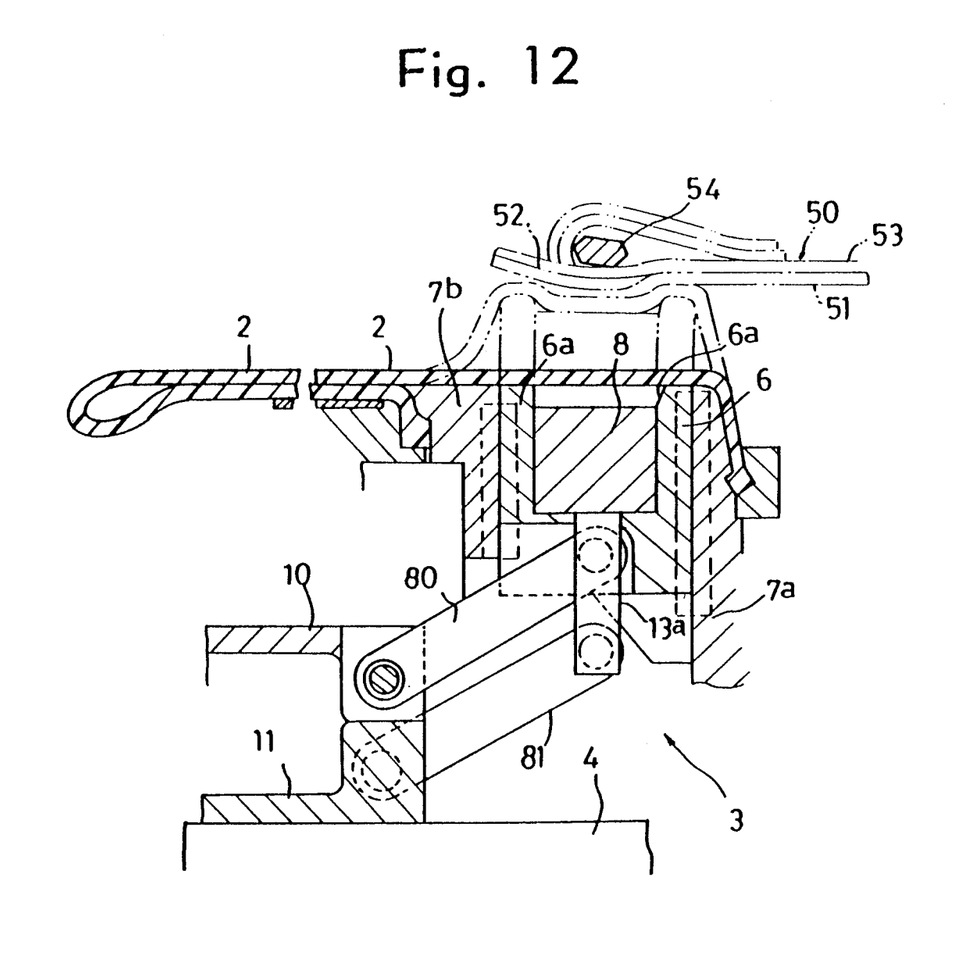
FIG. 12 is a view in central longitudinal section showing another embodiment of the invention.

FIG. 12 shows another embodiment of the present invention, wherein the first piston 10 is connected to each segment 6 by a first link 80, and the second piston 11 is connected to each connecting rod 13a by a second link 81.

The present invention is not limited to the embodiments described.

What is claimed is:

1. A method for locking a bead in a process of manufacturing a green tire with use of a green tire building machine having a building drum, and bead support segments arranged circumferentially of the building drum to be radially expandable, each bead support segment being shaped to have a recess formed with two opposite walls whose outer ends form outer ends of the bead support segments, and recesses being lined up in circumferential series to form an annular passage, and a radially expandable elastic ring being received in the recess, said method comprising the steps of:

(a) winding a tire material over the surface of the tire building drum such that both the outer ends of the bead support segments and the elastic rings are covered;

(b) placing the bead around the tire material at a position in superjacent alignment to the circularly arranged elastic ring, wherein the outer ends of the bead support segments are positioned to approach two opposing sides of the bead;

(c) radially expanding the elastic ring to a position above and between the outer ends of the respective bead support segments and pressing the inner face of the tire material by the outer surface of the elastic ring to abut against an inner portion of the bead;

(d) radially extending the bead support segments past the expanded position taken by the outer surface of the elastic ring such that the outer ends of the bead support segments are positioned above and on opposing sides of the outer surface of the elastic ring and the tire material lying below the bead is pushed up by the bead support segments for gripping up the bead with the tire material.

2. The method according to claim 1, further comprising the steps of:

a) installing a segment drive means for moving the bead support segments radially outward; and b) installing an elastic ring drive means for moving the elastic ring radially outward, said ring drive means being operable selectively and independently of the segment drive means.

* * * * *